United States Patent [19]

Wirth

[11] Patent Number: 4,638,891
[45] Date of Patent: Jan. 27, 1987

[54] SHAFT BRAKING DISC FOR RAIL VEHICLE DISC BRAKE

[75] Inventor: Xaver Wirth, Ismaning, Fed. Rep. of Germany

[73] Assignee: Knorr-Bremse AG, Munich, Fed. Rep. of Germany

[21] Appl. No.: 771,924

[22] Filed: Sep. 3, 1985

[30] Foreign Application Priority Data

Sep. 3, 1984 [DE] Fed. Rep. of Germany ....... 3432374

[51] Int. Cl.⁴ ..................... B61H 13/00; F16D 65/12; F16D 65/847; B21H 5/00
[52] U.S. Cl. ................... 188/58; 188/218 XL; 188/264 A; 301/6 CS
[58] Field of Search ............... 188/17, 18 A, 218 XL, 188/264 A, 264 AA, 64 R, 71.6, 58, 26, 218 R; 301/6 CS, 6 W, 6 WB, 64 R, 66, 80, 79, 74; 192/113 A, 70.12; 295/33, 26, 34

[56] References Cited

U.S. PATENT DOCUMENTS 1,386,086  8/1921  Alger ............................. 301/6 W X

FOREIGN PATENT DOCUMENTS 0713623  8/1954  United Kingdom ......... 188/218 XL

Primary Examiner—Douglas C. Butler
Assistant Examiner—Robert J. Oberleitner
Attorney, Agent, or Firm—Pollock, Vande Sande & Priddy

[57] ABSTRACT

Shaft braking disc with a unitary, ventilated friction ring (3), provided with ventilation ribs (4) some of which have radially inwardly extending support spokes (2) terminating in a hub (1) and having a cross section area which gradually diminishes in the radially inward direction. Attached to both sides of these spokes in the circumferential direction are reinforcement ribs (7) whose cross sectional areas gradually increase in the radially inward direction, in such manner that the sum of the cross sections of a support spoke (2) and its reinforcement ribs on both sides is at least substantially constant over the entire radial length of the spoke.

1 Claim, 3 Drawing Figures

SHAFT BRAKING DISC FOR RAIL VEHICLE DISC BRAKE

FIELD OF THE INVENTION

The present invention relates to a shaft braking disc, especially for the disc brakes of rail vehicles.

BACKGROUND OF THE INVENTION

Shaft braking discs of the type having a unitary friction ring with annular bodies on both sides and cooling air channels therebetween, these channels being limited by ventilation ribs unitary with the annular bodies and extending radially, are known, e.g., from European Patent No. 87 071. In this type of construction, at least some of the ventilation ribs, uniformly spaced along the circumference, are extended radially inwardly as support spokes and connected by the latter to a hub seated on the shaft to be braked. The spokes have a width, in the axial direction, which diminishes smoothly in the radially inward direction from the friction ring to the hub. The spokes have no reinforcement in the circumferential direction, so that their cross sectional area diminishes radially inwardly correspondingly to their width.

OBJECT OF THE INVENTION

It is an object of the invention to provide a shaft braking disc of this type in such manner that the connection of the friction ring with the hub is further improved, and in particular is rigid also in the circumferential direction, while permitting the heat expansion of the friction ring to be absorbed safely and without risk of cracking or breaking even during high brake disc loads.

SUMMARY OF THE INVENTION

This object is achieved by providing the support spokes on both sides in the circumferential direction with reinforcement ribs, which are applied to a radially outer end of the support spokes, which have a width increasing radially inwardly, and which terminate radially inwardly in the hub, the sum of the cross sectional areas of the support spokes and the reinforcement ribs being substantially constant over the entire radial length of the support spokes.

BRIEF DESCRIPTION OF THE DRAWINGS

In order that the invention may be more clearly understood, it will now be described in detail with reference to the accompanying drawings, in which an embodiment of the invention is shown by way of example, and in which.

DETAILED DESCRIPTION OF THE EMBODIMENTS

Figure 1:
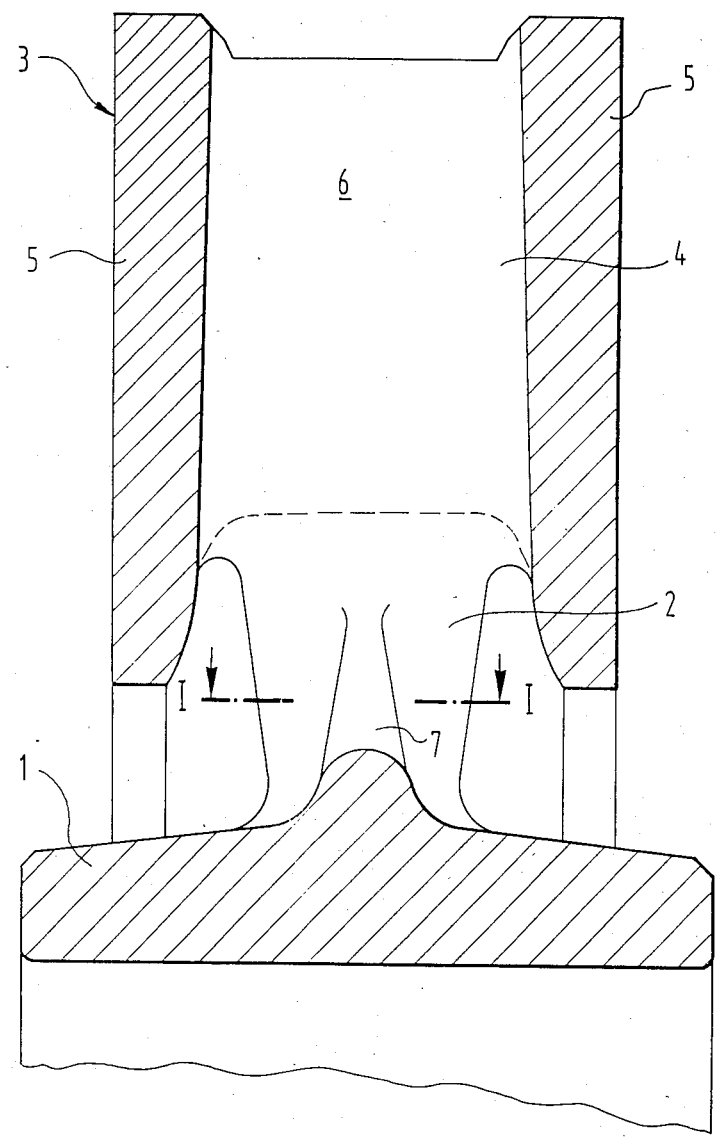
FIGS. 1 and 2 are cross-sectional views.

On a shaft to be braked (not shown) is seated, in the conventional, non-rotatable manner, a hub 1 from which support spokes 2, unitary with the hub and uniformly spaced along its circumference, extended radially outwardly and jut out into ventilation ribs 4 belonging to a friction ring 3. The latter consists of two axially staggered annular bodies 5 between which extend the radial cooling air channels 6 limited in the circumferential direction by ventilation ribs 4. The latter ribs and the support spokes 2 applied radially inwardly to some of the ventilation ribs are made unitary with annular bodies 5 and eventually also with hub 1, preferably by molding. Production through a series of successive molding steps is also possible.

Immediately at their point of meeting with ventilation ribs 4, support spokes 2 have a somewhat diminished width in the axial direction and a reinforcement in the circumferential direction. Radially inwardly toward hub 1, support spokes 2 narrow in both the axial and circumferential directions. In the circumferential direction, reinforcement ribs 7 are attached on both sides of support spokes 2. The reinforcement ribs start approximately at the radially outer ends of the support spokes, steadily broaden out in the radially inward direction, and terminate in hub 1. Thus, while support spokes 2 have a cross sectional area which steadily diminishes in the radially inward direction, the cross sectional area of the reinforcement ribs steadily increases radially inwardly.

Figures 2, 3:
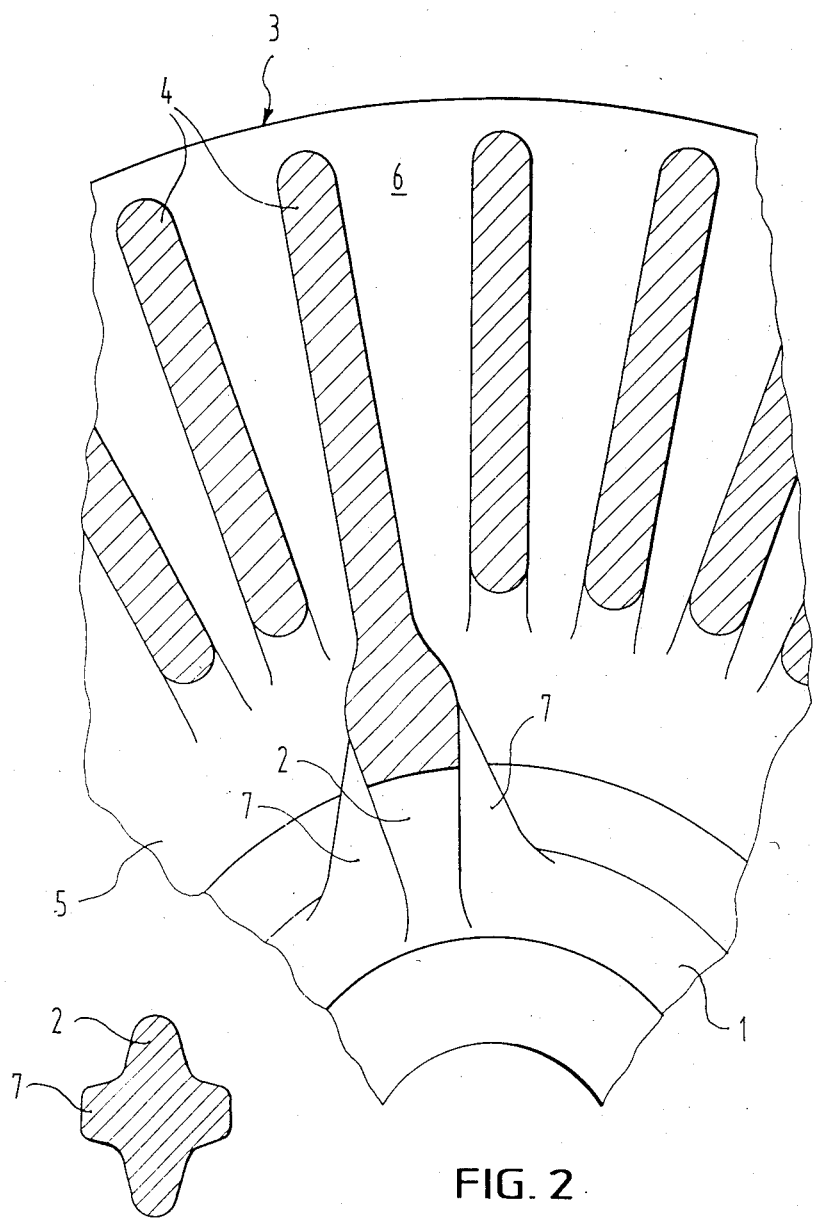
FIG. 3 is a section view along line I—I in FIG. 1.

FIG. 3 shows the cross sectional area of a support spoke 2 with attached reinforcement ribs 7, in a view along line I—I of FIG. 1. The change in the respective cross sectional areas of support spokes 2 and reinforcement ribs 7 is so calculated that the sum of these areas has a substantially constant value, whatever the location of cross-section line I—I along the entire radial length of a spoke 2.

What is claimed is:

1. Shaft braking disc for a rail vehicle disc brake having a unitary friction ring (3) with an annular body (5) on each of its sides and radial cooling air channels (6) therebetween, said channels being limited by ventilation ribs (4) unitary with said annular bodies and extending radially in the direction of the circumference, at least some of said ventilation ribs, uniformly spaced along said circumference, being extended radially inwardly as support spokes (2) and being connected with a hub (1) seated on a shaft to be braked, said support spokes having a width, in the axial direction, which diminishes smoothly from said friction ring (3) radially inwardly to said hub, said support spokes being provided on both sides in the circumferential direction with reinforcement ribs (7) applied to a radially outer end of said support spokes and having a width which increases radially inwardly, said reinforcement ribs terminating radially inwardly in said hub (1), the sum of the cross sectional areas of said support spokes (2) and said reinforcement ribs (7) being at least substantially constant over the entire radial length of said support spokes.

* * * * *